Patented Nov. 3, 1936

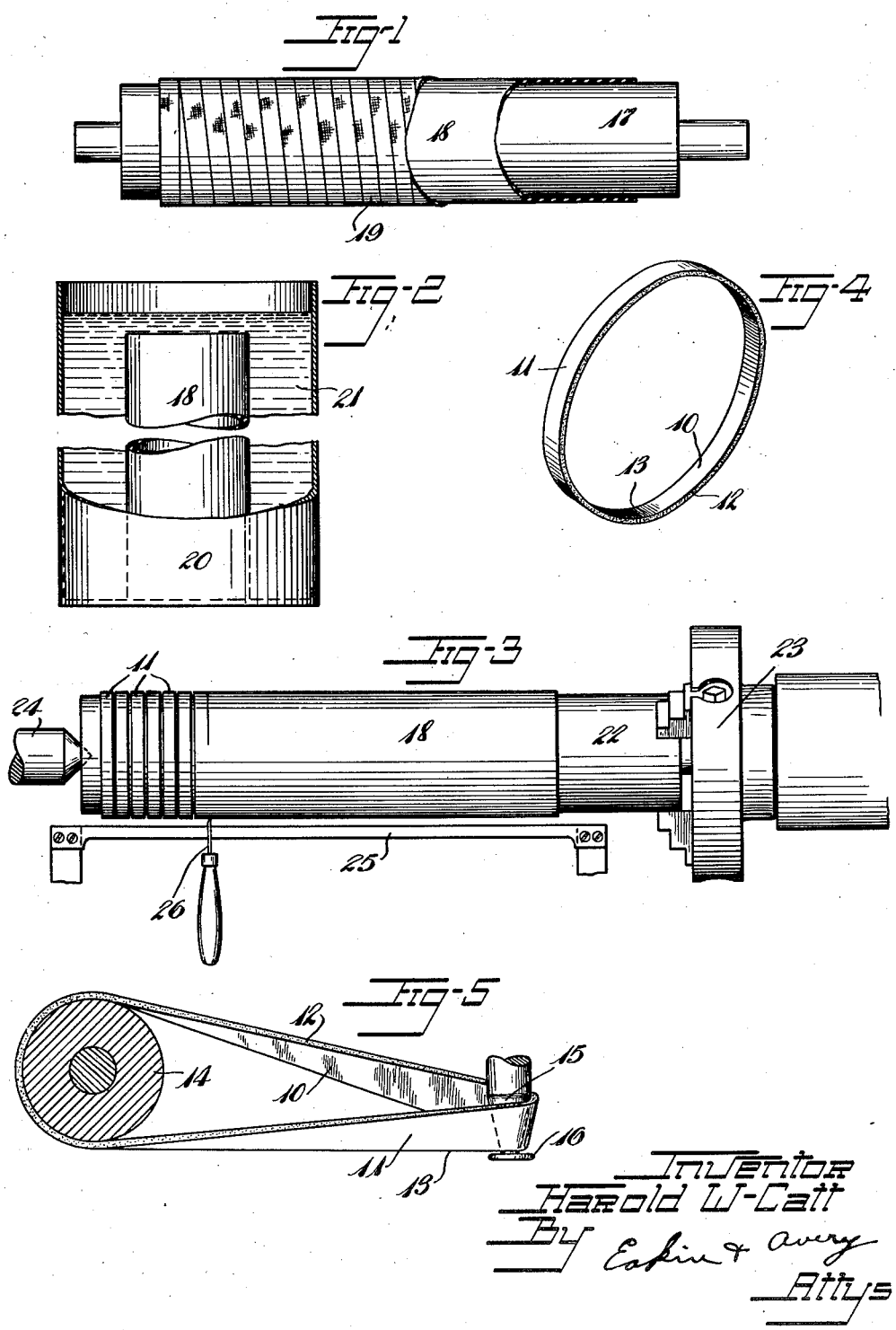

2,059,207

UNITED STATES PATENT OFFICE 2,059,207

ELASTIC RUBBER TRANSMISSION BAND

Harold W. Catt, Akron, Ohio, assignor to The B. F. Goodrich Company, New York, N. Y., a corporation of New York Application August 3, 1933, Serial No. 683,499

6 Claims. (Cl. 74—231)

This invention relates to elastic rubber transmission bands and to methods of making same.

Endless elastic transmission bands have been extensively used in driving such devices as electric sweepers where the amount of power normally required is small and variation in the load is frequent. Any sudden increase in the load is compensated for by stretching and slipping of the belt. In order to provide against clinging of the belt to the pulley it has been proposed to chlorinate or otherwise harden the entire surface of the belt after it has been molded or otherwise manufactured. Such hardening treatment of the entire surface often results in the belt acquiring a glazed surface so that when slipping occurs, local heating of the belt takes place which may seriously burn the belt at one position in its circumference.

The principal objects of the present invention are to provide against localized burning of the belt.

Other objects will appear from the following description and the accompanying drawing.

In the drawing:

Fig. 1 is a drawing illustrating a step in the manufacture of a belt according to the invention, parts of the material being broken away.

Fig. 2 is a drawing illustrating another step in the manufacture of the belt, part of the apparatus being broken away.

Fig. 3 is a drawing illustrating a ring-cutting lathe and showing another step in the manufacture of the belt.

Fig. 4 is a perspective view of the finished belt.

Fig. 5 is a view partly in section showing the belt in use, parts being broken away.

Referring to the drawing, the belt comprises an endless band of resilient rubber having a pair of opposite faces 10, 11 which have been chlorinated or otherwise treated to reduce their frictional properties, and having edges 12, 13 which are untreated so as to retain their natural frictional properties. Such belts are usually used to provide a quarter turn drive as illustrated in Fig. 5 wherein 14 is the driven pulley and 15 is a cone shaped drive pulley having a flange 16 at its small end. Whereas the treated face 10 provides low frictional resistance so as to tend to slide on the pulley when the driven pulley is overloaded, the raw edge 13, by contacting with the flange 16, when the drive is overloaded, causes a slight creeping of the belt so that no single portion of the belt becomes dangerously overheated.

The belt conveniently may be constructed by winding a sheet of rubber around a mandrel 17 to form a rubber tube 18. A winding of fabric tape 19 may be applied to compact the rubber. The tube 18 is then vulcanized, the tape 19 removed and the tube 18 taken off the mandrel.

The finished tube 18 may then be treated to harden its surface by immersing the tube in a vessel 20 containing chlorine water 21 or other fluid adapted to react with the rubber at the surface of the tube.

After the surface has been treated the tube 18 is again placed on a mandrel 22 rotatably supported as by a driven jaw chuck 23 and a dead center 24. A knife rest 25 is provided along the mandrel to support a knife 26 by which the tube is divided into rings, each of which constitutes a belt having a pair of treated faces and a pair of untreated edges such as shown in Figs. 4 and 5.

Other elements of the halogen group as bromine and iodine and other chemicals such as sulfur chloride may be used to treat the surface of the rubber. The treated surface while being somewhat hardened and having its frictional properties reduced is nevertheless elastic.

I claim:

1. A transmission belt comprising an endless band of elastic rubber having a driving face of hardened elastic rubber for engaging the faces of the pulleys and an edge of relatively high frictional character adapted to engage a flange on one of the pulleys.

2. A transmission belt comprising an endless band of elastic rubber having a driving face of hardened elastic rubber for engaging the face of the pulleys and a raw edge of untreated rubber adapted to engage a flange on one of the pulleys.

3. A transmission belt comprising an endless band of elastic rubber having a driving face of elastic halogenated rubber for engaging the faces of the pulleys and an edge of relatively high frictional character adapted to engage a flange on one of the pulleys.

4. A transmission belt comprising an endless band of elastic rubber having a driving face of elastic halogenated rubber for engaging the faces of the pulleys and an untreated raw edge adapted to engage a flange on one end of the pulleys.

5. A transmission belt comprising an endless band of elastic rubber, having a driving face of chlorinated rubber for engaging the faces of the pulleys and an edge of untreated rubber adapted to engage a flange on one of the pulleys.

6. A transmission comprising an endless band of elastic rubber, and a pair of pulleys, one of said pulleys having at least one guide flange, said band having at least one face having low frictional properties for engaging the faces of the pulleys in non-slipping relation thereto under light loads and at least one edge of high frictional characteristics adapted to engage the guide flange and cause creeping of the belt when the belt is overloaded.

HAROLD W. CATT.